Nov. 3 1925.  1,559,760
M. MURPHY
SANDWICH TOASTER
Filed June 16, 1925
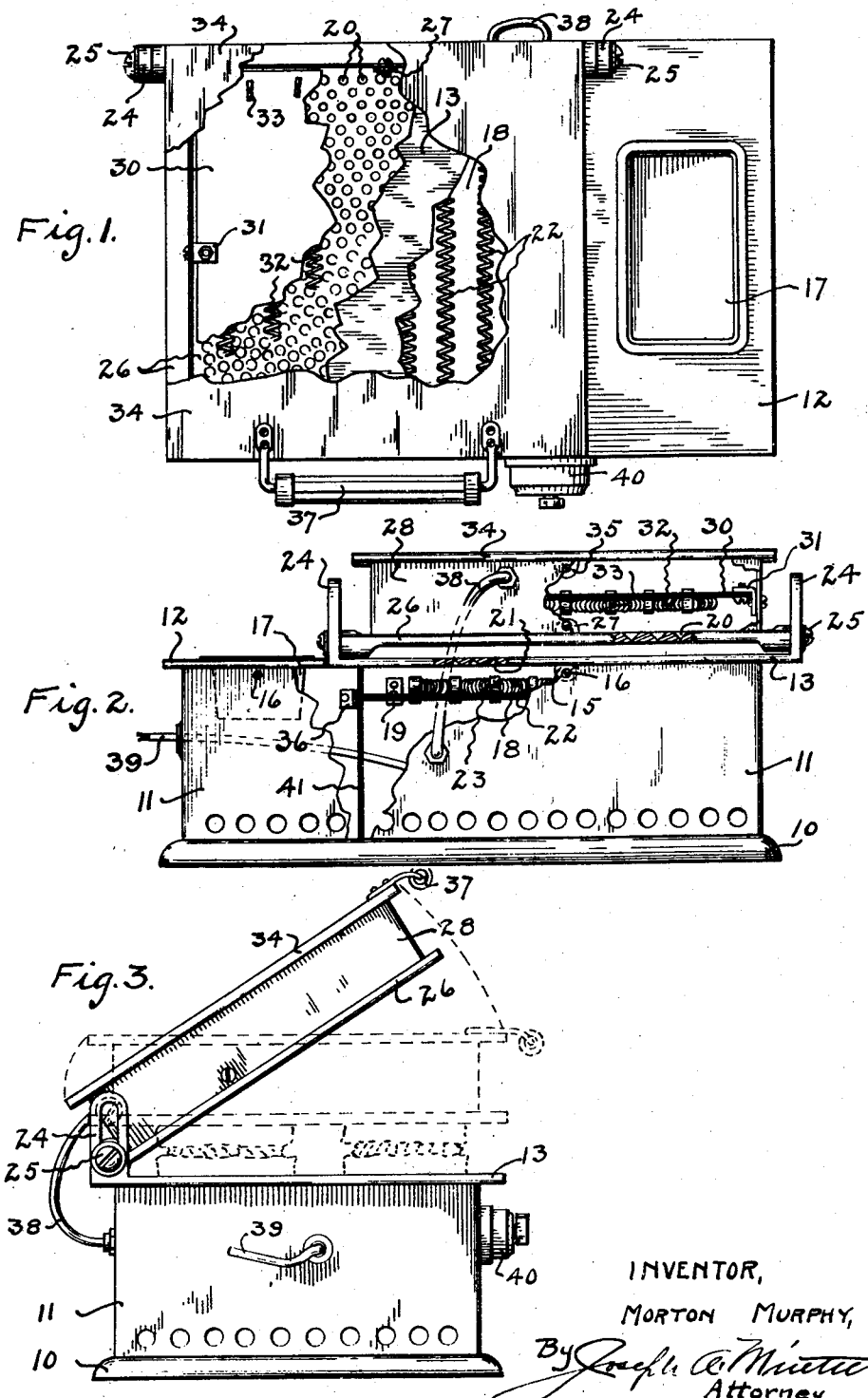
INVENTOR,
MORTON MURPHY,
By [signature]
Attorney.

Patented Nov. 3, 1925.

1,559,760

UNITED STATES PATENT OFFICE.

MORTON MURPHY, OF RUSHVILLE, INDIANA.

SANDWICH TOASTER.

Application filed June 16, 1925. Serial No. 37,452.

*To all whom it may concern:*

Be it known that I, MORTON MURPHY, a citizen of the United States, residing at Rushville, in the county of Rush and State of Indiana, have invented certain new and useful Improvements in Sandwich Toasters, of which the following is a specification.

My invention comprises an electrically heated device for the purpose of toasting both sides of a buttered sandwich simultaneously. Sandwiches have been toasted before, but only on one side at a time, which necessitated the turning of the sandwich over from one side onto the other, whereas, I accomplish the toasting operation without turning, and in half, or less, the amount of time.

In the old process, the sandwich was laid on a heated plate and a block of wood placed on top to effect the necessary pressure of contact, and where a number of sandwiches were to be prepared, such procedure became tedious and far too slow. My toaster can be varied in size to toast any desired number of sandwiches at one time.

Other objects of my invention reside in the simplified and consequent low cost of production; the adaptation to any thickness of sandwich; and in the facility of its operation.

I accomplish these and such other objects as will become apparent in the following description by the means as illustrated in the accompanying drawing, in which—

Fig. 1 is a top plan view of my toaster with fragments of the plates broken away to disclose the inner construction; Fig. 2, a rear elevation of the toaster, likewise having fragments of the walls removed; Fig. 3, a side elevation, showing the upper plate lifted to receive the sandwiches, and indicating by dash lines, the position of the plate with the sandwiches being toasted.

Like characters of reference indicate like parts throughout the several views of the drawing.

To a base 10, I secure the enclosing box-like wall 11 which extends around the four sides of the base and carries the top plates 12 and 13 secured thereto by the depending lugs 15 with machine screws 16 passing through the wall 11 and the lugs.

The plate 12 has a hole therethrough to detachably receive the butter receptacle 17 which projects downwardly through the plate 12 practically its entire depth. The plates 12 and 13 may be formed in one piece, but I find it better to use the separate plates.

The plate 13 is the lower plate upon which the sandwiches are placed. Below the plate 13 is the heat and electric current insulator board 18 which is secured to the wall 11 by brackets 19, two in number and L-shaped, to permit a machine screw to be passed through one leg from the wall 11 and one screw through the board and the other leg, such that the board 18 may be quickly removed when desired.

On the top face of the board 18, I place an electric heating element 22 of the common and well known coiled resistance wire type, and secure the element 22 to the board by means of a plurality of eyes 23 which encircle the element 22 and pass through the board 18 to be clinched on the under side.

This element 22 is employed to heat the plate 13 immediately above to the desired temperature, but does not contact the plate. The plate 13 has a plurality of depressions 21 made from the under side such that there will be an unequal transmission of heat in the plate 13 so as to give a varying color pattern to the browned toast. Without the spotted variations in thickness of the plate 13, the toast would assume a brownness of the same intensity over the entire surface which is not so attractive to the eye as the mottled effect I produce.

At each back corner of the plate 13 is an upright standard 24, each having a slotted hole from bottom to top to receive a retaining hinge screw 25 passing therethrough into the upper plate 26 to act as hinge pins. The plate 26 has its upper surface corrugated or indented by a plurality of depressions 20 so as to make the plate thin at spots with a smooth outer contacting surface, the same as plate 13.

The plate 26 has the lugs 27 (here shown as two in number) extending upwardly as a means of securing the element box 28. Carried within the element box 28 is the insulating board 30 removably secured to the walls of the box 28 by the L-brackets 31, and attached to the under side of the board 30 is an electrical heating element 32 secured by the eyes 33 passing around the element coils through the board 28 and clinched over on its upper side.

A finish and weight plate 34 covers the box 28 and is thereon secured by the depending lugs 35.

A handle 37 is attached to the finish plate 34 as a means of lifting and swinging the various attached members as above described about the hinge screws 25.

Conducting wires lead from the upper heating element 32 through the flexible cable 38 into the space below the lower element 22, where suitable connections are made with the current supplying cable 39, the two elements and the control switch 40, all in a manner well known and within the knowledge of any electrician.

To prevent an undue amount of heat reaching the butter receptacle 17 from the heating element 22, though some heat is wanted, I place an insulating partition 41 vertically against the side of the insulating board 18 and there hold it by means of an L-bracket 36 pressing against the partition 41, at each end on a line centrally of the center line of the board 18. The current supply cable 39 is passed through this partition 41 and to without the wall 11 where it may be led to any suitable current supplying means.

In operating my toaster, the sandwiches are buttered by the melted butter in the receptacle 17, the upper plate 26 is tilted backwardly by the handle 37, the sandwiches laid on the plate 13, and the plate 26 is then swung down on top of the sandwiches where it is allowed to press by its own weight. As the supporting standards 24 are slotted, the rear end of the plate 26 may raise to permit the plate 26 to lie along on the entire upper surfaces of the sandwiches, thereby adjusting itself to the thickness of the sandwich. The switch 40 is turned on and the sandwiches allowed to brown. With the elements as I have employed, the actual toasting occupies but 40 seconds, though this time may be varied by varying the heating elements.

It is to be noted that the plate faces contacting the sandwiches, both upper and lower, are perfectly smooth and without openings and that the heating elements, though quickly uncovered for inspection or replacement, are entirely enclosed and protected.

It is obvious that structural changes may be made without departing from the spirit of the invention, and I therefore do not want to be limited to the precise structure as shown, nor any more than may be required by the following claims.

I claim:

1. In a toaster, a lower plate having a smooth upper surface and a pitted under surface, a heating element below the lower plate, an upper plate having a smooth under surface and a pitted upper surface, a heating element above the upper plate, standards having slotted guides, and hinge pins extending from the upper plate and engaging in the guides of the standards.

2. In a toaster, a lower plate, an insulating board removably placed below the plate, an electrical heating element detachably secured to the upper side of the board, an upper plate hingedly swinging onto said lower plate, an insulating board removably secured above the upper plate, and an electrical heating element detachably secured to the board.

3. In a toaster, a lower heating member comprising a toasting plate, and a heating element removably secured below the plate, an upper heating member comprising a toasting plate, a heating element removably secured above the plate, and means cooperating with said lower and upper heating members whereby the two heating members may be in parallel alignment at varying distance apart.

4. In a toaster, a lower supporting wall, a lower toasting plate, an electrical heating element secured on a heat insulating board removably held by the wall below the plate, vertically extending standards, an upper toasting plate, an electrical heating element on a heat insulating board removably held above the upper plate, hinge pins extending from the upper plate and adapted to travel in a vertically guided direction in said standards, and a weight plate above said upper plate enclosing the upper heating element.

5. In a toaster, a lower toasting plate, a removable heating element below the plate, a butter receptacle adjacent said heating element, an upper toasting plate, means of said upper plate assuming an even pressure over a sandwich on the lower plate, and a removable heating element above the upper plate.

6. In a toaster, a lower toasting plate, a heating element below the plate, a butter receptacle adjacent said heating element, an upper toasting plate, means of said upper plate assuming an even pressure over a sandwich on the lower plate, and a heating element above the upper plate, and a heat deflector between said butter receptacle and said lower heating element.

In testimony whereof I affix my signature.

MORTON MURPHY.